Patented Aug. 1, 1944

2,354,671

UNITED STATES PATENT OFFICE 2,354,671

INSOLUBLE NITROGENOUS RESIN FROM POLYPHENYLOL SULPHUR COMPOUNDS

John W. Eastes, Philadelphia, Pa., assignor to The Resinous Products & Chemical Company, Philadelphia, Pa., a corporation of Delaware No Drawing. Application April 9, 1941,
Serial No. 387,684

12 Claims. (Cl. 260—45)

This invention relates to insoluble nitrogenous resins which are well suited for the removal of acidic constituents from fluids and for ion exchange, and to a method of preparation of these resins from formaldehyde, polynuclear phenols having hydroxyaryl groups joined through a sulphur atom, and alkylene polyamines, the alkylene group of which may be interrupted by at least one —NH— group to form alkylene chains of at least two carbon atoms each between nitrogen atoms. The resins of this invention are characterized by their hardness, physical strength, insolubility, and high capacity for absorbing acidic constituents. In these respects they possess a better balance of properties than is found in nitrogenous resins heretofore available.

The nitrogenous resinous compositions of this invention are prepared by reacting a polynuclear phenol, the hydroxyaryl groups of which are joined through a sulphur atom or bridge with formaldehyde to form a soluble methylol derivative, reacting this derivative under controlled conditions as to temperature with an alkylene polyamine, the alkylene group of which may be interrupted by one or more —NH— groups, to form a resinous gel, and producing a resin therefrom by drying this gel between about 70° C. and the temperature of incipient decomposition or scorching point of the resulting resin.

The phenols which may be used have the general formula

HO—Ar—X—Ar—OH where Ar is an aryl nucleus, such as phenyl nucleus, and X is a member of the class consisting of —S—, —SO—, and —SO₂—. Typical of these are dihydroxyphenyl sulphide, 4,4'-dihydroxy ditolyl sulphide, dihydroxyphenyl sulphoxide, dihydroxyphenyl sulphone, 4,4'-dihydroxy ditolyl sulphone, etc. As indicated, the phenyl nucleus may carry a neutral substituent such as alkyl, alkoxy, aryl, aryloxy, acyl, etc., so long as there remain hydrogen atoms available for replacement in the aromatic rings in positions which are ortho and/or para to the hydroxyl groups. These compounds fall within the class commonly designated as "methylol-forming" and are further characterized by the fact that they impart a high degree of hardness and insolubility to the resins which may be formed from them.

The proportion of phenylol compound to polyamine may be varied over a considerable range. The use of relatively large ratios of phenylol compound to polyamine ensures hardness of the final resin, a particularly desirable property when the resins are to be used with warm or hot liquids or gases. Such large ratios, however, decrease the acid absorbing capacity of the resin on a volume or weight basis. On the other hand, as the ratio of polyamine to phenylol compound is increased, the capacity for anions or other acidic constituents increases. The balance of these effects is most satisfactory within the proportions of two mols of polyamine per phenylol group and one-half mol of polyamine per phenylol group.

Typical of the polyamines which may be used are ethylene diamine, diethylene triamine, triethylene tetramine, tetraethylene pentamine, etc., N,N'-bis(aminopropyl)ethylene diamine, propylene diamine, tris(trimethylene)tetramine, as well as other polyalkylene polyamines.

Formaldehyde may be used as an aqueous or solvent solution, as a gas, or as a solid polymer, such as paraformaldehyde. Part of the formaldehyde may be supplied by compounds which yield methylene groups, such as hexamethylene tetramine. Formaldehyde is preferably used in an amount at least equivalent to each phenylol group and to the mols of polyamine. Excess formaldehyde while not essential, appears to contribute to the final hardness of the resin. Sufficient formaldehyde may be added to the phenylol compound at one time to form the nitrogenous condensates or formaldehyde may be added in several stages of the reaction. In a particularly effective method of preparation sufficient formaldehyde is reacted with the phenylol compound followed by reaction with the polyamine. Thereupon, more formaldehyde is added to complete resin formation.

To obtain insoluble nitrogenous resins of suitable properties for removal of acidic constituents, the three main reactants must be so combined that the final resin contains polyamine groups attached to the phenyl nuclei through methylene groups. At the same time an advanced stage of resinification must be reached without loss of amino groups. To obtain the most effective resins the reaction should be controlled within well-defined conditions. It is advisable, for example, to avoid the catalytic effect of the amines which would normally lead to insoluble resins of little value for anion exchange or removal of acids. This may be readily accomplished by so reacting the phenylol compound and formaldehyde as to form a soluble methylol derivative. The phenylol compound is first taken up in an aqueous medium. It may be solubilized at least in part with alkali. Upon the addition of and reaction with formaldehyde all of the phenylol compound becomes solubilized and reacted even though the compound was only partially dissolved at the start. During mixing of phenylol compound and formaldehyde it is desirable to have the temperature below 60° C. The temperature may then be raised to ensure complete reaction, temperatures up to 90° C. being permissible.

The solution is then cooled in order to control the next stage of the resin formation. Best results are obtained when the solution is cooled below 32° C. The alkylene polyamine is then carefully added, resulting in an exothermic reaction, which is controlled by rate of mixing and/or cooling. During the addition of alkylene polyamine the temperature should be kept below about 40° C. If the temperature is allowed to rise unduly, there usually separates from the reaction mixture curds of an insoluble resin which has been catalyzed by the presence of the polyamine and which is of no value.

Upon subsidence of the exothermic reaction the reaction mixture may be heated to complete the reaction. Alternatively, as already explained, additional formaldehyde may be added at this point. Such addition should be made under controlled conditions of temperature to avoid premature separation of an insoluble resin. The most convenient method of control is to cool the mixture below 32° C. and add formaldehyde with good stirring. The two-stage addition of formaldehyde somewhat simplifies the control required for the formation of resins which are highly active for absorption of acidic constituents. Two-stage addition is not, however, essential, as sufficient formaldehyde may be added at the start to yield the desired nitrogenous resinous material and by careful control of the several reactions a product with an excellent balance of properties may be obtained.

During the above described steps formation of a gel is usual. In some cases, however, it may be necessary to bring the reaction mixture to a gel stage. This is accomplished by heating it to 75° C. to 100° C. The gel is broken up and dried between about 70° C. and the temperature at which scorching or incipient decomposition of the resulting resin would occur. At the scorching temperature there begins a decomposition which results in loss of nitrogen. While this upper temperature limit varies somewhat from resin to resin, it is in general between about 135° C. and 150° C. The dried resin is suitable for use for the absorption of acidic constituents or anion exchange from gaseous or liquid mixtures. Preferably, the dry resin is crushed to a desired size such as 20/40 mesh, 20/50 mesh, 40/50 mesh, or the like, washed with water, with a dilute alkaline solution such as a solution of sodium carbonate, and again with water, and used in a wet condition or dried at moderate temperature before use.

The preparation of the resins of this invention is illustrated by the following example.

62.5 parts of diphenyl sulphone and 8 parts of sodium hydroxide were taken up in 150 parts of water and 41 parts of aqueous 37% formaldehyde slowly added thereto. The reaction mixture was slowly heated to 80° C. and maintained at this temperature until a clear solution resulted. This was cooled to 30° C. and 95 parts of tetraethylene pentamine slowly added while the mixture was maintained below 40° C. by external cooling. There was then slowly added 82 parts of aqueous 37% formaldehyde while the mixture was stirred. The temperature rose and a gel formed. The gel was heated on a steam bath for an hour, broken up, dried in an oven at 120° C. for sixteen hours, crushed to a 20/40 mesh size, washed with water, with a 5% soda ash solution, and again with water, and dried at about 50° C. There was thus obtained 205 parts of a hard, strong resin which had a capacity of 286 milligrams of sulphuric acid per gram of resin. The resin was tested in a column to determine its effectiveness for removal of strong acids and regeneration, and was found to maintain its absorption capacity over a long period of use.

A column $\tfrac{7}{8}$" in diameter was filled with 85 ml. of the above resin and there was passed downflow through this resin at a flow rate of 5 gallons per square foot per minute a solution containing 74.4 P. P. M. of hydrogen chloride and 420 P. P. M. of sulphuric acid. The effluent had a pH of 6 to 7 until the first trace of chloride ion appeared therein, whereupon it dropped. At this point the resin had absorbed 433 mg. of hydrogen chloride and 3040 mg. of sulphuric acid. This is equivalent to 2300 grains of hydrogen chloride and 16,100 grains of sulphuric acid per cubic foot, or a total anion capacity as $CaCO_3$ of 19,600 grains per cubic foot. For regeneration there was then passed downflow through the column a quantity of a 2% solution of sodium carbonate in an amount equivalent to one-half pound of sodium carbonate as sodium chloride per kilograin of anion absorbed as $CaCO_3$ at a rate of one gallon per square foot per minute. The column was flushed with pure water and then used again for the adsorption of acid with the same efficiency as before.

In place of the diphenylol sulphone shown above there may be used the molecular equivalent of other polyphenylol compounds having phenylol groups joined through sulphur. Likewise, the tetraethylene pentamine may be replaced with molecularly equivalent amounts of other alkylene polyamines, such as diethylene triamine, triethylene tetramine, propylene diamine, etc. The resins from these various combinations all possess the desired balance of properties for the effective removal of acidic constituents from liquids or gases with subsequent regeneration and reuse at high efficiency. They also have some capacity for the absorption and exchange of cations.

The resins of this invention may be prepared in conjunction with carriers or fillers, such as silica, starch, alumina, alpha floc, etc. The polyphenylol compounds may be reacted with formaldehyde and alkylene polyamine in conjunction with other phenols by the procedure described to yield phenol-formaldehyde type resins carrying nuclear aminomethyl groups which have a similar balance of high capacity and desirable physical properties as to strength, hardness, low degree of swelling, insolubility, and stability during regeneration and use. This balance of properties is at a maximum in the resinous compositions herein described and in the comparable resins formed from the polyphenylol alkanes which are claimed in application Serial No. 387,686, filed on even date.

I claim:

1. An insoluble nitrogenous resinous composition suitable for the absorption of acidic constituents from fluids and for ion exchange which comprises the product obtained by reacting by condensing together in an aqueous medium a polynuclear methylol-forming phenol having phenylol groups joined through sulphur, one-half mol to two mols of an alkylene polyamine per phenylol group, and formaldehyde in an amount at least equivalent to each phenylol group and to the mols of polyamine, continuing the reaction of these three components until a hydrophilic gel forms, and heating said gel between about 70° C. and the scorching temperature of the resulting resin until said resin is insoluble in dilute strong acids, said resinous composition being further characterized by physical strength, suitability for use in columns, high capacity for absorbing acidic constituents, and stability during repeated use and regeneration.

2. An insoluble nitrogenous resinous composition suitable for the absorption of acidic constituents from fluids and for ion exchange which comprises the product obtained by reacting by condensing together in an aqueous medium a diphenylol sulphone, one-half mol to two mols of a polyethylene polyamine per phenylol group, and formaldehyde in an amount at least equivalent to each phenylol group and to the mols of polyamine, continuing the reaction of these three components until a hydrophilic gel forms, and heating said gel between about 70° C. and the scorching temperature of the resulting resin until said resin is insoluble in dilute strong acids, said resinous composition being further characterized by physical strength, suitability for use in columns, high capacity for absorbing acidic constituents, and stability during repeated use and regeneration.

3. An insoluble nitrogenous resinous composition suitable for the absorption of acidic constituents from fluids and for ion exchange which comprises the product obtained by reacting by condensing together in an aqueous medium 4,4'diphenylol sulphone, one-half mol to two mols of tetraethylene pentamine per phenylol group, and formaldehyde in an amount at least equivalent to each phenylol group and to the mols of pentamine, continuing the reaction of these three components until a hydrophilic gel forms, and heating said gel between about 70° C. and the scorching temperature of the resulting resin until said resin is insoluble in dilute strong acids, said resinous composition being further characterized by physical strength, suitability for use in columns, high capacity for absorbing acidic constituents, and stability during repeated use and regeneration.

4. An insoluble nitrogenous resinous composition suitable for the absorption of acidic constituents from fluids and for ion exchange which comprises the product obtained by reacting by condensing together in an aqueous medium 4,4'diphenylol sulphone, one-half mol to two mols of triethylene tetramine per phenylol group, and formaldehyde in an amount at least equivalent to each phenylol group and to the mols of tetramine, continuing the reaction of these three components until a hydrophilic gel forms, and heating said gel between about 70° C. and the scorching temperature of the resulting resin until said resin is insoluble in dilute strong acids, said resinous composition being further characterized by physical strength, suitability for use in columns, high capacity for absorbing acidic constituents, and stability during repeated use and regeneration.

5. An insoluble nitrogenous resinous composition suitable for the absorption of acidic constituents from fluids and for ion exchange which comprises the product obtained by reacting by condensing together in an aqueous medium 4,4'diphenylol sulphone, one-half mol to two mols of diethylene triamine per phenylol group, and formaldehyde in an amount at least equivalent to each phenylol group and to the mols of triamine, continuing the reaction of these three components until a hydrophilic gel forms, and heating said gel between about 70° C. and the scorching temperature of the resulting resin until said resin is insoluble in dilute strong acids, said resinous composition being further characterized by physical strength, suitability for use in columns, high capacity for absorbing acidic constituents, and stability during repeated use and regeneration.

6. A method for preparing insoluble nitrogenous resinous compositions suitable for the absorption of acidic constituents from fluids and further characterized by strength, suitability for use in columns, high capacity for acidic constituents, and stability during repeated use and regeneration, which comprises reacting by condensing together in an aqueous system a polynuclear methylol-forming phenol having phenylol groups joined through sulphur, one-half mol to two mols of an alkylene polyamine per phenylol group, and formaldehyde in an amount at least equivalent both to each phenylol group and to the mols of polyamine, continuing the reaction of these three components until a hydrophilic gel forms, and heating said gel between about 70° C. and the scorching temperature of the resulting resin until said resin is insoluble in dilute strong acids.

7. A method for preparing insoluble nitrogenous resinous compositions suitable for the absorption of acidic constituents from fluids and further characterized by strength, suitability for use in columns, high capacity for acidic constituents, and stability during repeated use and regeneration, which comprises reacting by condensing together in an aqueous system a diphenylol having a sulphur linkage between the hydroxyphenyl groups, one-half mol to two mols of a polyalkylene polyamine per hydroxyphenyl group, and formaldehyde in an amount at least equivalent both to each hydroxyphenyl group and to the mols of polyamine, continuing the reaction of these three components until a hydrophilic gel forms, and heating said gel between about 70° C. and the scorching temperature of the resulting resin until said resin is insoluble in dilute strong acids.

8. A method for preparing insoluble nitrogenous resinous compositions suitable for the absorption of acidic constituents from fluids and further characterized by physical strength, suitability for use in columns, high capacity for acidic constituents, and stability during repeated use and regeneration, which comprises reacting in an aqueous system diphenylol sulphone and formaldehyde to form a soluble methylol compound in solution, adding thereto and reacting therewith while maintaining the temperature of the reaction mixture below about 40° C. one-half mol to two mols of a polyalkylene polyamine per phenylol group, continuing the said reaction until a hydrophilic gel is formed, and heating the gel between about 70° C. and the scorching temperature of the resulting resin until said resin is insoluble in dilute strong acids, the total amount of formaldehyde being at least equivalent both to the phenylol groups and to the mols of polyalkylene polyamine.

9. A method for preparing insoluble nitrogenous resinous compositions suitable for the absorption of acidic constituents from fluids and further characterized by physical strength, suitability for use in columns, high capacity for acidic constituents, and stability during repeated use and regeneration, which comprises reacting by condensing in an aqueous medium containing alkali a diphenylol sulphone and formaldehyde to form a soluble methylol compound in solution, adding thereto and reacting by condensing therewith while maintaining the temperature of the reaction mixture below about 40° C. one-half mol to two mols of a polyethylene polyamine per phenylol of said sulphone, then adding additional formaldehyde to the reaction mixture, continuing the condensation of the three components until a gel is formed, and heating said gel between about 70° C. and the scorching temperature of the resulting resin until said resin is insoluble in dilute strong acids, the total amount of formaldehyde being at least equivalent both to the phenylol groups and to the mols of polyethylene polyamine.

10. A method for preparing insoluble nitrogenous resinous compositions suitable for the absorption of acidic constituents from fluids and further characterized by physical strength, suitability for use in columns, high capacity for acidic constituents, and stability during repeated use and regeneration, which comprises reacting by condensing in an aqueous medium containing alkali a diphenylol sulphone and formaldehyde to form a soluble methylol compound in solution, adding thereto and reacting by condensing therewith while maintaining the temperature of the reaction mixture below about 40° C. one-half mol to two mols of tetraethylene pentamine per phenylol of said sulphone, then adding additional formaldehyde to the reaction mixture, continuing the condensation of the three components until a gel is formed, and heating said gel between about 70° C. and 135° C. until said resin is insoluble in dilute strong acids, the total amount of formaldehyde being at least equivalent both to the phenylol groups and to the mols of tetraethylene pentamine.

11. A method for preparing insoluble nitrogenous resinous compositions suitable for the absorption of acidic constituents from fluids and further characterized by physical strength, suitability for use in columns, high capacity for acidic constituents, and stability during repeated use and regeneration, which comprises reacting by condensing in an aqueous medium containing alkali a diphenylol sulphone and formaldehyde to form a soluble methylol compound in solution, adding thereto and reacting by condensing therewith while maintaining the temperature of the reaction mixture below about 40° C. one-half mol to two mols of triethylene tetramine per phenylol of said sulphone, then adding additional formaldehyde to the reaction mixture, continuing the condensation of the three components until a gel is formed, and heating said gel between about 70° C. and 135° C. until said resin is insoluble in dilute strong acids, the total amount of formaldehyde being at least equivalent both to the phenylol groups and to the mols of triethylene tetramine.

12. A method for preparing insoluble nitrogenous resinous compositions suitable for the absorption of acidic constituents from fluids and further characterized by physical strength, suitability for use in columns, high capacity for acidic constituents, and stability during repeated use and regeneration, which comprises reacting by condensing in an aqueous medium containing alkali a diphenylol sulphone and formaldehyde to form a soluble methylol compound in solution, adding thereto and reacting by condensing therewith while maintaining the temperature of the reaction mixture below about 40° C. one-half mol to two mols of diethylene triamine per phenylol of said sulphone, then adding additional formaldehyde to the reaction mixture, continuing the condensation of the three components until a gel is formed, and heating said gel between about 70° C. and 135° C. until said resin is insoluble in dilute strong acids, the total amount of formaldehyde being at least equivalent both to the phenylol groups and to the mols of diethylene triamine.

JOHN W. EASTES.